United States Patent Office 2,849,508
Patented Aug. 26, 1958

2,849,508

SIDE CHAIN ALKYLATION OF ALKYLAROMATICS WITH OLEFINS USING AN ORGANOMETALLIC COMPOUND AS CATALYST

Herman Pines, Evanston, Ill., assignor to Universal Oil Products Company, Des Plaines, Ill., a corporation of Delaware No Drawing. Application June 8, 1955
Serial No. 514,114

22 Claims. (Cl. 260—668)

This invention relates to the condensation of unsaturated organic compounds with aromatic compounds and to products formed thereby. This invention relates more particularly to the side chain alkylation with an olefin of an alkylaromatic hydrocarbon in which a carbon atom combined with the aromatic nucleus is also combined with at least one hydrogen atom. The process relates more particularly to the side chain ethylation of an alkylbenzene hydrocarbon having at least one hydrogen atom combined with a carbon atom in the alpha position to the benzene ring.

The condensation of aromatic compounds with unsaturated organic compounds such as the alkylation of aromatic hydrocarbons with olefinic hydrocarbons has been the subject of many investigations over a long period of time. Many different catalysts have been used including various mineral acids and acid-acting compounds but in all these reactions, nuclear condensation has always been effected. Thus, in the acid catalyzed alkylation of aromatic compounds having attached to a carbon atom of the ring the saturated carbon atom to which is attached at least one hydrogen atom, the entering alkyl group attaches to the aromatic nucleus. No direct catalytic method of introducing the alkyl group into the side chain has been known, particularly, a direct catalytic method which can be utilized at reasonably low operating pressures and moderate temperatures. Such can now be accomplished by utilization of the process of this invention.

I have found that side chain alkylation of toluene with an olefin can be effected. Similarly, side chain alkylation can be effected with other carbocylic aromatic and heterocyclic aromatic ring compounds which have nonolefinic double bonds such as pyridine, quinoline, pyrrole, etc., and which have attached to a nuclear carbon atom a saturated carbon atom to which is attached at least one hydrogen atom. These ring compounds may also be used as starting materials to effect side chain alkylation with an olefin at moderate temperatures and pressures in the presence of a catalyst comprising essentially a free alkali metal and a minor promoting amount of a conjugated polyolefinic hydrocarbon. The carbon atom which is attached to the aromatic nucleus of said aromatic compounds is referred to as a saturated carbon atom because it is part of a nonolefinic group such as an alkyl group, a cycloalkyl group, a cycloalkalkyl group, or an aralkyl group containing no ethylenic double bonds or similar unsaturation. The carbon atom which is attached to an aromatic nucleus is thus a part of a saturated group including an alkyl group, a cycloalkyl group, a cycloalkalkyl group, and an aralkyl group (such as a $C_6H_5$—$CH_2$— group) containing no olefinic unsaturation.

An object of this invention is to react an unsaturated organic compound with an aromatic compound selected from the group consisting of carbocyclic and heterocyclic aromatic ring compounds having attached to a nuclear carbon atom a nonolefinic or saturated carbon atom to which is attached at least one hydrogen atom.

An additional object of this invention is to react a monoolefin with an alkylaromatic hydrocarbon to form an aromatic hydrocarbon with a longer alkyl group.

Another object of this invention is to condense ethylene with the side chain of an aromatic compound having attached to a nuclear carbon atom a saturated carbon atom to which is attached at least one hydrogen atom.

Another object of this invention is to condense ethylene with the side chain of an alkylaromatic hydrocarbon having attached to a nuclear carbon atom a carbon atom of said alkyl group to which is attached at least one hydrogen atom.

Still another object of this invention is to condense ethylene with the alkyl side chain of an alkylbenzene hydrocarbon, said side chain containing an alpha carbon atom to which is attached a replaceable hydrogen atom.

A further object of this invention is to condense ethylene with the cycloalkyl group of a cycloalkylbenzene hydrocarbon, said cycloalkyl group having a hydrogen atom combined with the carbon atom of the cycloalkyl group which is attached to the aromatic ring.

A still further object of this invention is to provide a process for the side chain alkylation of an alkylaromatic hydrocarbon.

A further object of this invention is to condense ethylene with a polycyclic aromatic hydrocarbon having at least one of the rings saturated and having at least one hydrogen atom combined with the carbon atom of the saturated ring which is attached to the aromatic ring.

An additional object of this invention is to provide a method for producing an aromatic compound containing a longer hydrocarbon side chain, said compound being useful in the production of detergents, wetting agents, and the like.

One embodiment of this invention relates to a process which comprises reacting a nonconjugated olefinic hydrocarbon and an aromatic compound selected from the group consisting of carbocyclic aromatic and heterocyclic aromatic ring compounds having attached to the nuclear carbon atom a carbon atom of a hydrocarbon group selected from the group consisting of an alkyl group, a cycloalkyl group, a cycloalkalkyl group, and an aralkyl group and to which last-named carbon atom is attached at least one hydrogen atom, the process being carried out at a temperature of from about 100° to about 350° C. and at a pressure of from about 5 to about 50 atmospheres in the presence of a free alkali metal and of a minor promoting amount of a conjugated polyolefinic hydrocarbon capable of reacting with a portion of said free alkali metal to form an organoalkali metal compound, and recovering the resultant condensation products.

A second embodiment of this invention relates to a process which comprises reacting a nonconjugated olefinic hydrocarbon and an aromatic compound selected from the group consisting of carbocyclic aromatic and heterocyclic aromatic ring compounds having attached to a nuclear carbon atom a carbon atom of a saturated hydrocarbon group and to which last-named carbon atom is attached at least one hydrogen atom at a temperature of from about 100° to about 350° C. and at a pressure of from about 5 to about 50 atmospheres in the presence of a free alkali metal and of a minor promoting amount of a conjugated polyolefinic hydrocarbon capable of reacting with a portion of said free alkali metal to form an organoalkali metal compound, and recovering the resultant condensation products.

Another embodiment of this invention relates to a process which comprises reacting a nonconjugated olefinic hydrocarbon and an aromatic compound selected from the group consisting of carbocyclic aromatic and heterocyclic aromatic ring compounds having attached to a nuclear carbon atom a carbon atom of a saturated hydrocarbon group and to which last-named carbon atom is attached at least one hydrogen atom at a temperature of from about 100° to about 350° C. and at a pressure of from about 5 to about 50 atmospheres in the presence of a free alkali metal and of a minor promoting amount of a conjugated diolefinic hydrocarbon capable of reacting with a portion of said free alkali metal to form an organoalkali metal compound, and recovering the resultant condensation products.

Still another embodiment of this invention relates to a process which comprises reacting a nonconjugated olefinic hydrocarbon and an aromatic compound selected from the group consisting of carbocyclic aromatic and heterocyclic aromatic ring compounds having attached to a nuclear carbon atom a carbon atom of a saturated hydrocarbon group and to which last-named carbon atom is attached at least one hydrogen atom at a temperature of from about 100° to about 350° C. and at a pressure of from about 5 to about 50 atmospheres in the presence of a free alkali metal and of a minor promoting amount of a conjugated diene capable of reacting with a portion of said free alkali metal to form an organoalkali metal compound, and recovering the resultant condensation products.

A further embodiment of this invention relates to a process which comprises reacting a monoolefin with an aromatic compound selected from the group consisting of carbocyclic aromatic and heterocyclic aromatic ring compounds having attached to a nuclear carbon atom a carbon atom of a hydrocarbon group selected from the group consisting of an alkyl group, a cycloalkyl group, a cycloalkalkyl group, and an aralkyl group and to which last-named carbon atom is attached at least one hydrogen atom, the process being carried out at a temperature of from about 100° to about 350° C. and at a pressure of from about 5 to about 50 atmospheres in the presence of a free alkali metal and of a minor promoting amount of a conjugated polyolefinic hydrocarbon capable of reacting with a portion of said free alkali metal to form an organoalkali metal compound, and recovering the resultant condensation products.

A further embodiment of this invention relates to a process which comprises reacting an alkene with an aromatic compound selected from the group consisting of carbocyclic aromatic and heterocyclic aromatic ring compounds having attached to a nuclear carbon atom a carbon atom of a hydrocarbon group selected from the group consisting of an alkyl group, a cycloalkyl group, a cycloalkalkyl group, and an aralkyl group and to which last-named carbon atom is attached at least one hydrogen atom, the process being carried out at a temperature of from about 100° to about 350° C. and at a pressure of from about 5 to about 50 atmospheres in the presence of a free alkali metal and of a minor promoting amount of a conjugated polyolefinic hydrocarbon capable of reacting with a portion of said free alkali metal to form an organoalkali metal compound, and recovering the resultant condensation products.

A still further embodiment of this invention relates to a process which comprises reacting ethylene and an aromatic hydrocarbon having attached to a nuclear carbon atom a carbon atom of a saturated hydrocarbon group and to which last-named carbon atom is attached at least one hydrogen atom at a temperature of from about 100° to about 350° C. and at a pressure of from 5 to about 50 atmospheres in the presence of a free alkali metal and of a minor promoting amount of a conjugated polyolefinic hydrocarbon capable of reacting with a portion of said free alkali metal to form an organoalkali metal compound, and recovering the resultant condensation products.

A still further embodiment of this invention relates to a process which comprises reacting ethylene and a benzene hydrocarbon having attached to a nuclear carbon atom a carbon atom of a saturated hydrocarbon group and to which last-named carbon atom is attached at least one hydrogen atom at a temperature of from about 100° to about 350° C. and at a pressure of from about 5 to about 50 atmospheres in the presence of a free alkali metal and of a minor promoting amount of a conjugated polyolefinic hydrocarbon capable of reacting with a portion of said free alkali metal to form an organoalkali metal compound, and recovering the resultant condensation products.

An additional embodiment of this invention relates to a process for producing n-propylbenzene which comprises reacting ethylene and toluene at a temperature of from about 100° to about 350° C. and at a presure of from about 5 to about 50 atmospheres in the presence of a catalyst comprising essentially a free alkali metal and a minor promoting amount of a conjugated polyolefinic hydrocarbon capable of reacting with a portion of said free alkali metal, to form an organoalkali metal compound, and recovering n-propylbenzene from the resultant reaction product.

Still another embodiment of this invention relates to a process for producing n-propylbenzene which comprises reacting ethylene and toluene at a temperature of from about 100° to about 350° C. and at a pressure of from about 5 to about 50 atmospheres in the presence of a catalyst comprising essentially free sodium and a minor promoting amount of isoprene capable of reacting with a portion of said free sodium to form an organosodium compound, and recovering n-propylbenzene from the resultant reaction product.

The compounds with which unsaturated organic compounds are condensed in my process comprise aromatic compounds having attached to a nuclear carbon atom a carbon atom of a saturated hydrocarbon group and to which last-named carbon atom is attached at least one hydrogen atom. By the term aromatic compound I mean to include not only alkylated benzenes, substituted benzenes, naphthalenes, and derivatives thereof, but also all compounds containing the stable ring or nucleus such as is present in benzene and which possess unsaturation in the sense that benzene does. Consequently, it can be seen that the term aromatic compound, in the sense in which it is used in the specification and the appended claims, includes not only carbocyclic compounds, but also heterocyclic compounds having stable nuclei. The carbocyclic compounds may have a benzene, naphthalene, etc., nucleus. The heterocyclic compounds may have a pyridine, furan, thiophene, pyrrole, pyrazole, etc., nucleus. In addition, the aromatic compounds contemplated for use in my process may contain both a carbocyclic ring and a heterocyclic ring such as is found in indole and in carbazole. Also, the aromatic compounds may contain both a benzene nucleus and a cycloalkane nucleus such as is found in tetralin and in indan.

As hereinbefore stated, the aromatic compounds preferred for use in my process contain a saturated side chain, said side chain being attached to a nuclear carbon atom by a saturated carbon atom, that is a carbon atom that is bonded to the univalent bonds to four other atoms. The saturated carbon atom should have at least one hydrogen atom attached thereto. These requisites are desirable for the reason that aromatic compounds, such as tert-butylbenzene, which do not have a hydrogen atom attached to the alpha carbon atom, show very little or no tendency under the conditions of operation employed in my process to undergo condensation of the type herein taught. Similarly, styrene, in which the alpha carbon atom in the side chain is unsaturated, does not condense with the unsaturated organic compounds in the manner herein specified. Thus, the preferred aromatic compounds are those in which the alpha carbon atom of the side chain is saturated and in which said alpha carbon atom has at least one hydrogen atom attached thereto. The side chain may comprise only one carbon atom as the methyl group in toluene, or it may comprise a number of saturated carbon atoms in straight chain or branched chain relation such as the normal butyl radical or the isobutyl radical in n-butylbenzene and in isobutylbenzene, respectively. The substituent need not necessarily be an aliphatic chain; it may be a cycloalkane radical as in tetralin or as a cyclohexylbenzene or an aralkyl group as the benzyl group as in diphenylmethane.

Suitable alkylaromatic hydrocarbons include toluene, ethylbenzene, n-propylbenzene, isopropylbenzene (cumene), n-butylbenzene, isobutylbenzene, m-xylene, o-xylene, p-xylene, mesitylene, methylnaphthalene, and the like. Other suitable aromatic hydrocarbons include cyclohexylbenzene, indan, diphenylmethane, cyclopentylbenzene, cyclohexylbenzene, methylethylbenzene, etc.

The aromatic ring in the compounds herein referred to may contain other substituents such as a chloro group, a methoxy group, an ethoxy group, a nitro group, and the like.

The aromatic reactants employed in my process are condensed with nonconjugated unsaturated organic compounds. The unsaturated organic compounds are olefinic in character and include monoolefins and particularly ethylene. For the purpose of this invention, aromatic compounds such as benzene are not regarded as being unsaturated. Examples of unsaturated organic compounds suitable for use in this process include monoolefins such as ethylene, propylene, 1-butene, 2-butene, isobutylene, the amylenes, hexenes, heptenes, including various isomers, etc., along with other monoolefins of higher molecular weight; nonconjugated dienes such as 2,5-dimethyl-1,5-hexadiene, and nonconjugated polyolefins containing more than two pairs of double bonds per molecule. As stated above, ethylene is particularly preferred as are other monoolefins in which the alpha carbon atom adjacent to the double bond is completely saturated. Other similar unsaturated compounds are well known to one skilled in the art.

Catalysts which are useful in this process include free alkali metals and a minor promoting amount of a conjugated polyolefinic hydrocarbon preferably those which react with a portion of said free alkali metals to form organoalkali metal compounds. In other words, the catalysts which are useful in this process include free alkali metals in combination with metalized conjugated polyolefinic hydrocarbons formed in situ by the reaction of a portion of the alkali metal with the conjugated polyolefinic hydrocarbon promoter which is added thereto. Preferred conjugated olefinic hydrocarbons are conjugated diolefinic hydrocarbons or conjugated dienes. Of the alkali metal group including lithium, potassium, sodium, rubidium, and cesium, the more plentiful sodium and potassium are generally preferred and particularly sodium is preferred because of its relatively low cost. These alkali metals are used in conjunction with a minor but promoting amount of a conjugated polyolefinic hydrocarbon including conjugated diolefinic hydrocarbons or dienes such as butadiene, isoprene, 2,3-dimethylbutadiene, 1,3-pentadiene, 2-methyl-1,3-pentadiene, 3-methyl-1,3-pentadiene, 4-methyl-1,3-pentadiene, 2,3-dimethyl-1,3-pentadiene, 2,4-dimethyl-1,3-pentadiene, 3,4-dimethyl-1,3-pentadiene, and the like. These conjugated polyolefinic hydrocarbons can be represented by the following formula:

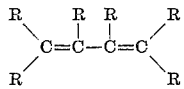

in which R is hydrogen, alkyl, alkenyl, cycloalkyl, cycloalkenyl, aryl, aralkyl, alkaryl, etc. Furthermore, two or more R substituents may be joined to form saturated or unsaturated ring systems such as occur in the terpene series with the conjugated double bond system, within, or within and without the basic ring of the terpenic hydrocarbon. Terpenic hydrocarbons which are suitable conjugated polyolefinic hydrocarbons include myrcene, ocimene, allo-ocimene, alpha-terpene, alpha-phellandrene, alpha-pyronene, beta-pyronene, gamma-pyronene, etc. Of course, the simple cyclic dienes such as cyclopentadiene and 1,3-cyclohexadiene are also utilizable. Similarly vinyl aromatic compounds are suitable promoters, i. e., styrene, vinyl furan, vinyl pyridine, etc. In these compounds the conjugation is between an aromatic nucleus and an olefinic double bond, thus providing the requisite conjugated polyolefinic structure. The presence of both free alkali metals and a minor promoting amount of one or more of the mentioned class of conjugated polyolefinic hydrocarbons is necessary for effecting the condensation of an olefin such as ethylene with the alkyl side chain or other saturated side chain of a carbocyclic or heterocyclic ring compound having attached to a nuclear carbon atom a saturated carbon atom to which is attached at least one hydrogen atom at a temperature of from about 100° to about 350° C. and at a pressure of from about 5 to about 50 atmospheres.

Better contacting of the reactants and catalyst and improved yields of desired products is sometimes effected by mixing the free alkali metal and conjugated polyolefinic hydrocarbon catalyst mixture with a catalyst support or spacing material such as activated charcoal. Also, granular coke, silica, alumina, pumice, porcelain, quartz, etc., steel turnings, copper shot, etc., which do not have an adverse influence on the reaction but which improve the mixing may be used. Such spacing materials are useful in either batch type operation as in an autoclave, or in continuous treatment in a tubular reactor or other suitable apparatus.

The process of this invention is carried out using either batch or continuous types of operation in suitable equipment such as an autoclave or tubular reactors constructed from steel or glass-lined steel reactors. The process is carried out at a temperature of from about 100° to about 350° C. and preferably at a temperature of from about 150° to about 275° C. at a pressure of from about 5 to about 50 atmospheres. When the stirring or mixing of the reactants and catalyst is very thorough and efficient, the process may be carried out readily at a temperature of 125° C. and at a pressure of 5 atmospheres but higher temperatures and pressures are preferred when the mixing is less efficient. Pressures of greater than 50 atmospheres are not necessary and temperatures greater than about 350° C. will seldom be needed. The operating temperatures and pressure will also depend upon the aromatic and olefinic hydrocarbons charged and upon the ratios of reactants present in the reaction zone as well as upon the catalyst present therein.

In order to promote the primary side chain alkylation, that is, to attach only one alkyl group to the alkyl side chain and in some instances to diminish the loss of olefin through undesired side reactions, it is generally preferred to employ an excess of aromatic hydrocarbon to olefin such as ethylene in the process. In other words, the preferred ratio of aromatic hydrocarbon to olefinic hydrocarbon is greater than one.

The amount of free alkali metal catalyst used in the process is dependent upon the catalyst and reactivity of the aromatic hydrocarbon undergoing side chain alkylation and upon the nature of the olefin used as the side chain alkylating agent. It has been found that rather large amounts of free alkali metal are desirable, particularly when the reaction is carried out under conditions which do not assure thorough mixing. It is preferred to use greater than about 2% by weight of free alkali metal based on the aromatic hydrocarbon reactant. The amount of conjugated polyolefinic hydrocarbon promoter necessary has been determined as the mol ratio of free alkali metal to conjugated polyolefinic hydrocarbon promoter. A mol ratio of free alkali metal to promoter greater than 2 is always desirable; mol ratios of free alkali metal to promoter of greater than 5 are preferred and better results have been obtained when this mol ratio is 10:1 or higher. This of course means that when the percentage of free alkali metal based upon the aromatic reactant is fixed, smaller amounts of conjugated polyolefinic hydrocarbon promoter are more desirable than larger amounts. The larger amounts result in lower mol ratios as hereinabove stated.

In carrying out the process the olefinic hydrocarbon such as ethylene may be introduced continuously or intermittently, the latter method being normally employed in the usual type of batch operation conducted in an autoclave so that the consumption of ethylene can be followed by observing the decrease in operating a pressure of the autoclave as the reaction progresses. After the reaction has reached the desired stage of completion, the reaction products are discharged from the autoclave, unsaturated olefins such as ethylene are recovered for further use in the process or utilized for some other purpose. A mixture of reaction products is then subjected to suitable separation treatment such as filtration to remove consumed alkali metal catalyst and promoter followed by fractional distillation of the normally liquid products to separate unconverted charging stock from side chain alkylated products and higher boiling materials, the latter being sometimes formed as by-products of the reaction.

In this process one molecular proportion of olefin such as ethylene and one molecular proportion of alkylaromatic hydrocarbon such as toluene react in the presence of a catalyst such as sodium and a minor promoting amount of isoprene to form a longer side chain alkylaromatic hydrocarbon as illustrated by the following equation:

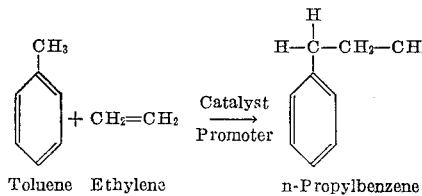

Toluene  Ethylene  n-Propylbenzene

The resultant reaction product such as n-propylbenzene may sometimes react with a further molecular proportion of olefin such as ethylene to form a still longer chain alkylaromatic hydrocarbon as indicated in the following equation:

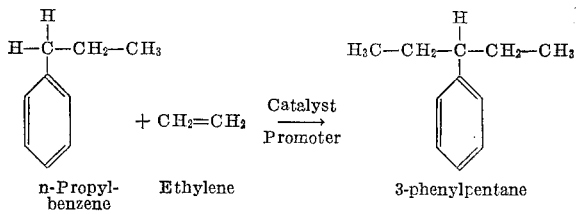

n-Propyl-  Ethylene  3-phenylpentane
benzene

Other alkylaromatic hydrocarbons and cycloalkylaromatic hydrocarbons may be reacted similarly with ethylene to produce longer chain alkylaromatic hydrocarbons from one molecular proportion of the charged alkylaromatic hydrocarbon and one, two, or more molecular proportions of the olefin.

The side chain alkylated compounds and particularly long chain alkylaromatic hydrocarbons formed in this process are useful as starting materials for the production of wetting agents, synthetic detergents, and the like. For example, a long chain alkylbenzene hydrocarbon such as tridecylbenzene which is produced by condensing n-butylbenzene or sec-butylbenzene with a nonene fraction formed by polymerizing propylene in the presence of a solid phosphoric acid catalyst is a suitable starting material for detergent production. The tridecylbenzene is sulfonated with concentrated sulfuric acid to form tridecylbenzene sulfonic acid which is then neutralized with caustic soda, sodium bicarbonate, or other alkaline material to form a salt of tridecylbenzene sulfonic acid, said salt being useful as a detergent for the washing of soiled cotton cloth or other materials. Some of the other condensation products formed by this process are also useful as intermediates in the production of chlorinated alkylaryl hydrocarbons useful as insecticides and the condensation products may also be used as intermediates in the production of dyes, medicinals, etc.

The nature of this invention is illustrated further by the following examples, which, however, should not be misconstrued to limit unduly the generally broad scope of the invention.

EXAMPLE I

A glass lined rotatable steel autoclave of 850 cc. capacity was charged with 92 grams of toluene and 10 grams of sodium. The autoclave was then closed and ethylene was introduced into the autoclave to an initial pressure of 30 atmospheres. The autoclave containing the toluene, sodium, and ethylene was then rotated and heated for three hours at a temperature of 200–325° C. after which the autoclave was permitted to cool to room temperature. The residual ethylene was then discharged from the autoclave. The mixture of liquid products and used sodium was filtered to remove the sodium therefrom and the filtrate was subjected to fractional distillation. The distillation separated the liquid products into fractions and the fractions with their properties are shown in Table I:

*Table I.—Fractional distillation of reaction products from ethylation of toluene with sodium alone*

| Fraction No. | Boiling point, ° C. | Grams | |
|---|---|---|---|
| 1 | 109–113 | 89.3 | Toluene. |
| 2 | 113–156 | 1.2 | 0.3 gram toluene. |
| 3 | 156+ | 0.7 | Bottoms. |

As can be seen from the table, side chain ethylation if it occurred at all, yielded 1.6 grams of product. Neither n-propylbenzene nor 3-phenylpentane were observed in the product.

EXAMPLE II

This example illustrates the side chain alkylation of toluene with ethylene in the presence of sodium as the catalyst and isoprene as the catalyst promoter. In the following two experiments, essentially the same procedure as described in Example I was used. A summary of the charge, conditions, and product recovery is given in the following Table II:

*Table II.—Ethylation of toluene with sodium isoprene*

| Run No. | 1 | 2 |
|---|---|---|
| Toluene: | | |
| Grams | 92 | 92 |
| Mols | 1.0 | 1.0 |
| Ethylene, atmospheres | 30 | 30 |
| Sodium: | | |
| Grams | 5.7 | 7.9 |
| Mols | 0.25 | 0.34 |
| Isoprene: | | |
| Grams | 5.0 | 5.5 |
| Mols | 0.07 | 0.08 |
| Temperature, ° C | 200–226 | 200–225 |
| Duration, hours | 3.5 | 4.75 |
| Toluene reacted, mol percent | 30 | 44 |
| Yield, mol percent: | | |
| n-Propylbenzene | 56 | 57 |
| 3-phenylpentane | 10 | 21 |
| Mol ratio, sodium/promoter | 3.5 | 4.25 |

The yields given in the above table are based upon the mol percent of toluene charge reacted. The recovered unreacted toluene can of course be recycled for further conversion in the process.

With reference to runs 1 and 2 above, it will be noted that the reaction of toluene with ethylene proceeds at a temperature of about 200–225° C. and at an initial pressure of 30 atmospheres. The reaction is catalytic since only a relatively small amount of sodium is necessary to cause the reaction. The product of the reaction consists predominantly of n-propylbenzene and 3-phenylpentane. The presence of isopropylbenzene and n-amylbenzene was not detected. Side chain alkylation does not occur on contacting 92 grams of toluene with ethylene in the presence of sodium but in the absence of isoprene at 200–325° C. under pressure. A similar reaction carried out in the presence of sodium and of about 6–8 grams of isoprene caused side chain ethylation of toluene.

EXAMPLE III

This example was carried out in essentially the same manner as was followed in Example I, and illustrates the utilization of 2-methyl-1,3-pentadiene as a promoter for sodium.

92 grams of toluene (1.0 mol), 7.8 grams of sodium (0.34 mol), and 5.0 grams of 2-methyl-1,3-pentadiene (0.06 mol) were sealed into a glass-lined autoclave. The autoclave was then closed and ethylene was introduced into the autoclave to an initial pressure of 30 atmospheres. The autoclave containing the toluene, sodium, ethylene, and 2-methyl-1,3-pentadiene was then rotated and heated for 5.25 hours at a temperature of 200–229° C. after which the autoclave was permitted to cool to room temperature. The residual ethylene was then discharged from the autoclave. After filtration of the liquid products to remove used sodium and distillation, it was found that about 22 mol percent of the toluene reacted. A 57 mol percent yield of n-propylbenzene and a 21% yield of 3-phenylpentane were obtained. These yields were based upon the amount of toluene which reacted.

I claim as my invention:

1. In a process which comprises reacting a nonconjugated olefinic hydrocarbon and an aromatic compound selected from the group consisting of carbocyclic aromatic and heterocyclic aromatic ring compounds having attached to a nuclear carbon atom a carbon atom of a hydrocarbon group selected from the group consisting of an alkyl group, a cycloalkyl group, a cycloalkalkyl group, and an aralkyl group, and to which last-named carbon atom is attached at least one hydrogen atom, the improvement which comprises carrying out the reaction at a temperature of from about 100° to about 350° C. and at a pressure of from about 5 to about 50 atmospheres in the presence of a free alkali metal and of a minor promoting amount of a conjugated polyolefinic hydrocarbon capable of reacting with a portion of said free alkali metal to form an organoalkali metal compound, and recovering the resultant condensation products.

2. In a process which comprises reacting a non-conjugated olefinic hydrocarbon and an aromatic compound selected from the group consisting of carbocyclic aromatic and heterocyclic aromatic ring compounds having attached to a nuclear carbon atom a carbon atom of a saturated hydrocarbon group and to which last-named carbon atom is attached at least one hydrogen atom, the improvement which comprises carrying out the reaction at a temperature of from about 100° to about 350° C. and at a pressure of from about 5 to about 50 atmospheres in the presence of a free alkali metal and of a minor promoting amount of a conjugated polyolefinic hydrocarbon capable of reacting with a portion of said free alkali metal to form an organoalkali metal compound, and recovering the resultant condensation products.

3. In a process which comprises reacting a nonconjugated olefinic hydrocarbon and an aromatic compound selected from the group consisting of carbocyclic aromatic and heterocyclic aromatic ring compounds having attached to a nuclear carbon atom a carbon atom of a saturated hydrocarbon group and to which last-named carbon atom is attached at least one hydrogen atom, the improvement which comprises carrying out the reaction at a temperature of from about 100° to about 350° C. and at a pressure of from about 5 to about 50 atmospheres in the presence of free alkali metal and of a minor promoting amount of a conjugated diolefinic hydrocarbon capable of reacting with a portion of said free alkali metal to form an organoalkali metal compound, and recovering the resultant condensation products.

4. In a process which comprises reacting a nonconjugated olefinic hydrocarbon and an aromatic compound selected from the group consisting of carbocyclic aromatic and heterocyclic aromatic ring compounds having attached to a nuclear carbon atom a carbon atom of a saturated hydrocarbon group and to which last-named carbon atom is attached at least one hydrogen atom, the improvement which comprises carrying out the reaction at a temperature of from about 100° to about 350° C. and at a pressure of from about 5 to about 50 atmospheres in the presence of a free alkali metal and of a minor promoting amount of a conjugated diolefinic hydrocarbon capable of reacting with a portion of said free alkali metal to form an organoalkali metal compound, and recovering the resultant condensation products.

5. In a process which comprises reacting a monoolefin and an aromatic compound selected from the group consisting of carbocyclic aromatic and heterocyclic aromatic ring compounds having attached to a nuclear carbon atom a carbon atom of a hydrocarbon group selected from the group consisting of an alkyl group, a cycloalkyl group, a cycloalkalkyl group, and an aralkyl group, and to which last-named carbon atom is attached at least one hydrogen atom, the improvement which comprises carrying out the reaction at a temperature of from about 100° to about 350° C. and at a pressure of from about 5 to about 50 atmospheres in the presence of a free alkali metal and of a minor promoting amount of a conjugated polyolefinic hydrocarbon capable of reacting with a portion of said free alkali metal to form an organoalkali metal compound, and recovering the resultant condensation products.

6. In a process which comprises reacting a monoolefin and an aromatic compound selected from the group consisting of carbocyclic aromatic and heterocyclic aromatic ring compounds having attached to a nuclear carbon atom a carbon atom of a saturated hydrocarbon group and to which last-named carbon atom is attached at least one hydrogen atom, the improvement which comprises carrying out the reaction at a temperature of from about 100° to about 350° C., and at a pressure of from about 5 to about 50 atmospheres in the presence of a free alkali metal and of a minor promoting amount of a conjugated polyolefinic hydrocarbon capable of reacting with a portion of said free alkali metal to form an organoalkali metal compound, and recovering the resultant condensation products.

7. In a process which comprises reacting a monoolefin and an aromatic compound selected from the group consisting of carbocyclic aromatic and heterocyclic aromatic ring compounds having attached to a nuclear carbon atom a carbon atom of a saturated hydrocarbon group and to which last-named carbon atom is attached at least one hydrogen atom, the improvement which comprises carrying out the reaction at a temperature of from about 100° to about 350° C. and at a pressure of from about 5 to about 50 atmospheres in the presence of free alkali metal and of a minor promoting amount of a conjugated diolefinic hydrocarbon capable of reacting with a portion of said free alkali metal to form an organoalkali metal compound, and recovering the resultant condensation products.

8. In a process which comprises reacting a monoolefin and an aromatic compound selected from the group consisting of carbocyclic aromatic and heterocyclic aromatic ring compounds having attached to a nuclear carbon atom and a carbon atom of a saturated hydrocarbon group and to which last-named carbon atom is attached at least one hydrogen atom, the improvement which comprises carrying out the reaction at a temperature of from about 100° to about 350° C. and at a pressure of from about 5 to about 50 atmospheres in the presence of a free alkali metal and of a minor promoting amount of a conjugated diene capable of reacting with a portion of said free alkali metal to form an organoalkali metal compound, and recovering the resultant condensation products.

9. In a process which comprises reacting an alkene and an aromatic compound selected from the group consisting of carbocyclic aromatic and heterocyclic aromatic ring compounds having attached to a nuclear carbon atom a carbon atom of a hydrocarbon group selected from the group consisting of an alkyl group, a cycloalkyl group, a cycloalkalkyl group, and an aralkyl group, and to which last-named carbon atom is attached at least one hydrogen atom, the improvement which comprises carrying out the reaction at a temperature of from about 100° to about 350° C. and at a pressure of from about 5 to about 50 atmospheres in the presence of a free alkali metal and of a minor promoting amount of a conjugated polyolefinic hydrocarbon capable of reacting with a portion of said free alkali metal to form an organoalkali metal compound, and recovering the resultant condensation products.

10. In a process which comprises reacting an alkene and an aromatic compound selected from the group consisting of carbocyclic aromatic and heterocyclic aromatic ring compounds having attached to a nuclear carbon atom a carbon atom of a saturated hydrocarbon group and to which last-named carbon atom is attached at least one hydrogen atom, the improvement which comprises carrying out the reaction at a temperature of from about 100° to about 350° C., and at a pressure of from about 5 to about 50 atmospheres in the presence of a free alkali metal and of a minor promoting amount of a conjugated polyolefinic hydrocarbon capable of reacting with a portion of said free alkali metal to form an organoalkali metal compound, and recovering the resultant condensation products.

11. In a process which comprises reacting an alkene and an aromatic compound selected from the group consisting of carbocyclic aromatic and heterocyclic aromatic ring compounds having attached to a nuclear carbon atom a carbon atom of a saturated hydrocarbon group and to which last-named carbon atom is attached at least one hydrogen atom, the improvement which comprises carrying out the reaction at a temperature of from about 100° to about 350° C. and at a pressure of from about 5 to about 50 atmospheres in the presence of free alkali metal and of a minor promoting amount of a conjugated diolefinic hydrocarbon capable of reacting with a portion of said free alkali metal to form an organoalkali metal compound, and recovering the resultant condensation products.

12. In a process which comprises reacting an alkene and an aromatic compound selected from the group consisting of carbocyclic aromatic and heterocyclic aromatic ring compounds having attached to a nuclear carbon atom a carbon atom of a saturated hydrocarbon group and to which last-named carbon atom is attached at least one hydrogen atom, the improvement which comprises carrying out the reaction at a temperature of from about 100° to about 350° C. and at a pressure of from about 5 to about 50 atmospheres in the presence of a free alkali metal and of a minor promoting amount of a conjugated diene capable of reacting with a portion of said free alkali metal to form an organoalkali metal compound, and recovering the resultant condensation products.

13. In a process which comprises reacting ethylene and an aromatic compound selected from the group consisting of carbocyclic aromatic and heterocyclic aromatic ring compounds having attached to a nuclear carbon atom a carbon atom of a hydrocarbon group selected from the group consisting of an alkyl group, a cycloalkyl group, a cycloalkalkyl group, and an aralkyl group, and to which last-named carbon atom is attached at least one hydrogen atom, the improvement which comprises carrying out the reaction at a temperature of from about 100° to about 350° C. and at a pressure of from about 5 to about 50 atmospheres in the presence of a free alkali metal and of a minor promoting amount of a conjugated polyolefinic hydrocarbon capable of reacting with a portion of said free alkali metal to form an organoalkali metal compound, and recovering the resultant condensation products.

14. In a process which comprises reacting ethylene and an aromatic compound selected from the group consisting of carbocyclic aromatic and heterocyclic aromatic ring compounds having attached to a nuclear carbon atom a carbon atom of a saturated hydrocarbon group and to which last-named carbon atom is attached at least one hydrogen atom, the improvement which comprises carrying out the reaction at a temperature of from about 100° to about 350° C. and at a pressure of from about 5 to about 50 atmospheres in the presence of a free alkali metal and of a minor promoting amount of a conjugated polyolefinic hydrocarbon capable of reacting with a portion of said free alkali metal to form an organoalkali metal compound, and recovering the resultant condensation products.

15. In a process which comprises reacting ethylene and an aromatic compound selected from the group consisting of carbocyclic aromatic and heterocyclic aromatic ring compounds having attached to a nuclear carbon atom a carbon atom of a saturated hydrocarbon group and to which last-named carbon atom is attached at least one hydrogen atom, the improvement which comprises carrying out the reaction at a temperature of from about 100° to about 350° C. and at a pressure of from about 5 to about 50 atmospheres in the presence of free alkali metal and of a minor promoting amount of a conjugated diolefinic hydrocarbon capable of reacting with a portion of said free alkali metal to form an organoalkali metal compound, and recovering the resultant condensation products.

16. In a process which comprises reacting ethylene and an aromatic compound selected from the group consisting of carbocyclic aromatic and heterocyclic aromatic ring compounds having attached to a nuclear carbon atom a carbon atom of a saturated hydrocarbon group and to which last-named carbon atom is attached at least one hydrogen atom, the improvement which comprises carrying out the reaction at a temperature of from about 100° to about 350° C. and at a pressure of from about 5 to about 50 atmospheres in the presence of a free alkali metal and of a minor promoting amount of a conjugated diene capable of reacting with a portion of said free alkali metal to form an organoalkali metal compound, and recovering the resultant condensation products.

17. A process for producing a longer chain aromatic hydrocarbon which comprises reacting ethylene with an aromatic hydrocarbon having attached to a nuclear carbon atom a carbon atom of a saturated hydrocarbon group, and to which last-named carbon atom is attached at least one hydrogen atom at a condensation temperature of from about 100° to about 350° C. and at a condensation pressure of from about 5 to about 50 atmospheres in the presence of a catalyst comprising essentially a free alkali metal and a minor promoting amount of a conjugated polyolefinic hydrocarbon capable of reacting with a portion of said free alkali metal to form an organoalkali metal compound, and recovering the resultant condensation products.

18. A process for producing a longer chain benzene hydrocarbon which comprises reacting ethylene with a benzene hydrocarbon having attached to a nuclear carbon atom a carbon atom of a saturated hydrocarbon group and to which last-named carbon atom is attached at least one hydrogen atom at a condensation temperature of from about 100° to about 350° C. and at a pressure of from about 5 to about 50 atmospheres in the presence of a catalyst comprising essentially a free alkali metal and a minor promoting amount of a conjugated polyolefinic hydrocarbon capable of reacting with a portion of said free alkali metal to form an organoalkali metal compound, and recovering the resulting condensation products.

19. A process for producing n-propylbenzene which comprises condensing ethylene with toluene at a condensation temperature of from about 100° to about 350° C. and at a condensation pressure of from about 5 to about 50 atmospheres in the presence of a catalyst comprising essentially a free alkali metal and a minor promoting amount of a conjugated polyolefinic hydrocarbon capable of reacting with a portion of said free alkali metal to form an organoalkali metal compound, and recovering the resultant n-propylbenzene.

20. A process for producing n-propylbenzene which comprises condensing ethylene and toluene at a condensation temperature of from about 100° to about 350° C. and at a condensation pressure of from about 5 to about 50 atmospheres in the presence of a catalyst comprising essentially free sodium and a minor promoting amount of isoprene capable of reacting with a portion of said free sodium to form an organosodium compound, and recovering the resultant n-propylbenzene.

21. The improvement of claim 1 further characterized in that said conjugated polyolefinic hydrocarbon is an aliphatic hydrocarbon.

22. The improvement of claim 2 further characterized in that said conjugated polyolefinic hydrocarbon is an aliphatic diene.

References Cited in the file of this patent

UNITED STATES PATENTS

| | | |
|---|---|---|
| 2,548,803 | Little | Apr. 10, 1951 |
| 2,716,662 | Cohen et al. | Aug. 30, 1955 |
| 2,721,886 | Pines et al. | Oct. 25, 1955 |
| 2,728,802 | Closson et al. | Dec. 27, 1955 |